(12) United States Patent
Hwang et al.

(10) Patent No.: US 11,178,254 B2
(45) Date of Patent: *Nov. 16, 2021

(54) CHAINING VIRTUAL NETWORK FUNCTION SERVICES VIA REMOTE MEMORY SHARING

(71) Applicant: International Business Machines Corporation, Armonk, NY (US)

(72) Inventors: Jinho Hwang, Ossining, NY (US); Shriram Rajagopalan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/163,961

(22) Filed: Oct. 18, 2018

(65) Prior Publication Data

US 2019/0052735 A1 Feb. 14, 2019

Related U.S. Application Data

(63) Continuation of application No. 14/966,058, filed on Dec. 11, 2015, now Pat. No. 10,110,707.

(51) Int. Cl.
*H04L 29/06* (2006.01)
*H04L 29/08* (2006.01)

(52) U.S. Cl.
CPC .......... *H04L 67/42* (2013.01); *H04L 67/1097* (2013.01); *H04L 67/10* (2013.01)

(58) Field of Classification Search
CPC ...... H04L 67/10; H04L 67/1097; H04L 67/42
USPC ....................................................... 709/212
See application file for complete search history.

(56) References Cited

U.S. PATENT DOCUMENTS

| 5,321,816 A | 6/1994 | Rogan et al. |
| 8,312,462 B2 | 11/2012 | Chung et al. |
| 2003/0069939 A1* | 4/2003 | Russell ................. G06F 15/167 709/214 |
| 2006/0045005 A1* | 3/2006 | Blackmore ........... H04L 1/0079 370/216 |

(Continued)

FOREIGN PATENT DOCUMENTS

WO WO2013052068 A1 4/2013

OTHER PUBLICATIONS

Mell et al., "The NIST Definition of Cloud Computing," National Institute of Standards and Technology Special Publication 800-145, Sep. 2011, 7 pages.

(Continued)

*Primary Examiner* — Brian Whipple
*Assistant Examiner* — John Fan
(74) *Attorney, Agent, or Firm* — Yee & Associates, P.C.

(57) ABSTRACT

Chaining virtual network functions is provided using a remote direct memory access in software-defined data centers in order to minimize latency. A data packet is processed using a virtual network function of the computer. The data packet is inserted into a shared memory pool for processing via remote direct memory access by a remote computer according to a network function of the remote computer that corresponds to the network function of the computer. The data packet is sent to a target destination device via a network in response to the remote computer marking the data packet as processed in the shared memory pool.

15 Claims, 10 Drawing Sheets

(56) References Cited

U.S. PATENT DOCUMENTS

| | | |
|---|---|---|
| 2010/0103837 A1 | 4/2010 | Jungck et al. |
| 2011/0110380 A1* | 5/2011 | Muller ................ H04L 49/9057 370/412 |
| 2011/0182290 A1 | 7/2011 | Perkins |
| 2013/0332678 A1 | 12/2013 | Fitzpatrick et al. |
| 2014/0280669 A1 | 9/2014 | Harper, III et al. |
| 2016/0182684 A1 | 6/2016 | Connor et al. |
| 2016/0277509 A1* | 9/2016 | Qiang ..................... H04L 67/16 |
| 2016/0378530 A1* | 12/2016 | Ramasubramanian ...................... G06F 9/45558 718/1 |
| 2016/0380848 A1* | 12/2016 | Raney ..................... H04L 67/32 709/213 |
| 2017/0090987 A1 | 3/2017 | Hearn et al. |
| 2017/0168985 A1 | 6/2017 | Hwang et al. |

OTHER PUBLICATIONS

Marcelo Caggiani Luizelli, Leonardo Richter Bays, Luciana Salete Buriol, Marihno Pilla Barcellos, Luciano Paschoal Gaspary, "Piecing Together the NFV Provisioning Puzzle: Efficient Placement and Chaining of Virtual Network Functions", 2015 IFIP/IEEE, May 2015.

Office Action, dated Oct. 6, 2017, regarding U.S. Appl. No. 14/966,058, 28 pages.

Final Office Action, dated Jan. 8, 2018, regarding U.S. Appl. No. 14/966,058, 32 pages.

Notice of Allowance, dated Jun. 13, 2018, regarding U.S. Appl. No. 14/966,058, 15 pages.

\* cited by examiner

CHAINING VIRTUAL NETWORK FUNCTION SERVICES VIA REMOTE MEMORY SHARING

CROSS-REFERENCE TO RELATED APPLICATION(S)

This application is a continuation of U.S. patent application Ser. No. 14/966,058, filing date Dec. 11, 2015, the entire contents of which are incorporated herein by reference.

BACKGROUND

1. Field

The disclosure relates generally to providing network services and more specifically to chaining network function services via distributed memory sharing to increase data packet processing performance in software-defined cloud or network environments.

2. Description of the Related Art

A network service is an application running at the network application layer and above, that provides data storage, manipulation, presentation, communication or other capability which is often implemented using a client-server architecture based on application layer network protocols. Each network service is usually provided by a server component running on one or more computers and accessed via a network by client components running on other devices. However, client and server components may both run on the same machine. In addition, a dedicated server computer may offer multiple network services concurrently.

SUMMARY

According to one illustrative embodiment, a computer-implemented method for chaining virtual network functions is provided. A computer processes a data packet using a network function of the computer. The computer inserts the data packet into a shared memory pool for processing via remote direct memory access by a remote computer according to a network function of the remote computer that corresponds to the network function of the computer. The computer sends the data packet to a target destination device via a network in response to the remote computer marking the data packet as processed in the shared memory pool. According to other illustrative embodiments, a computer system and computer program product for chaining virtual network functions are provided.

DETAILED DESCRIPTION

Figure 1:
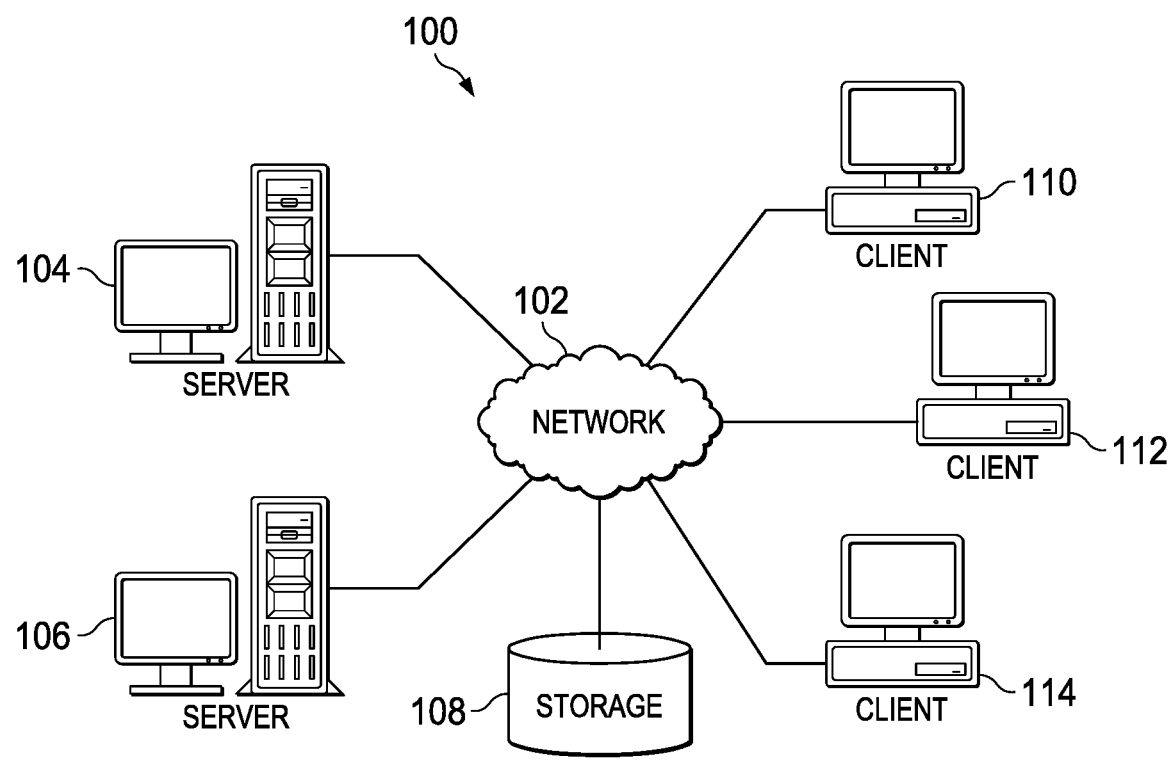
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-8, diagrams of data processing environments are provided in which illustrative embodiments may be implemented. It should be appreciated that FIGS. 1-8 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may each provide a set of one or more network services to registered clients.

Client 110, client 112, and client 114 also connect to network 102. Clients 110, 112, and 114 are clients of server 104 and server 106. Server 104 and server 106 may provide information, such as boot files, operating system images, virtual machine images, and software applications to clients 110, 112, and 114.

Clients 110, 112, and 114 may be data processing systems, such as, for example, network computers, desktop computers, laptop computers, tablet computers, handheld computers, smart phones, smart watches, personal digital assistants, gaming devices, and the like. However, it should be noted that clients 110, 112, and 114 are intended as examples only. In other words, clients 110, 112, and 114 may represent other types of data processing environments, such as a virtual machine environment. A virtual machine environment includes physical resources used to host and execute virtual machines to perform a set of one or more services or workloads for service consumers. A virtual machine environment may comprise, for example, one server, a rack of servers, a cluster of servers, such as a data center, a cloud of computers, such as a private cloud, a public cloud, or a hybrid cloud, or any combination thereof.

Storage 108 is a network storage device capable of storing any type of data in a structured format or an unstructured format. The type of data stored in storage 108 may be, for example, network function chaining managers, lists of local network function host computers and corresponding sets of network functions, lists of remote network function host computers and corresponding sets of network functions, virtual machine images, and lists of clients. Further, storage unit 108 may store other types of data, such as authentication or credential data that may include user names, passwords, and biometric data associated with system administrators.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
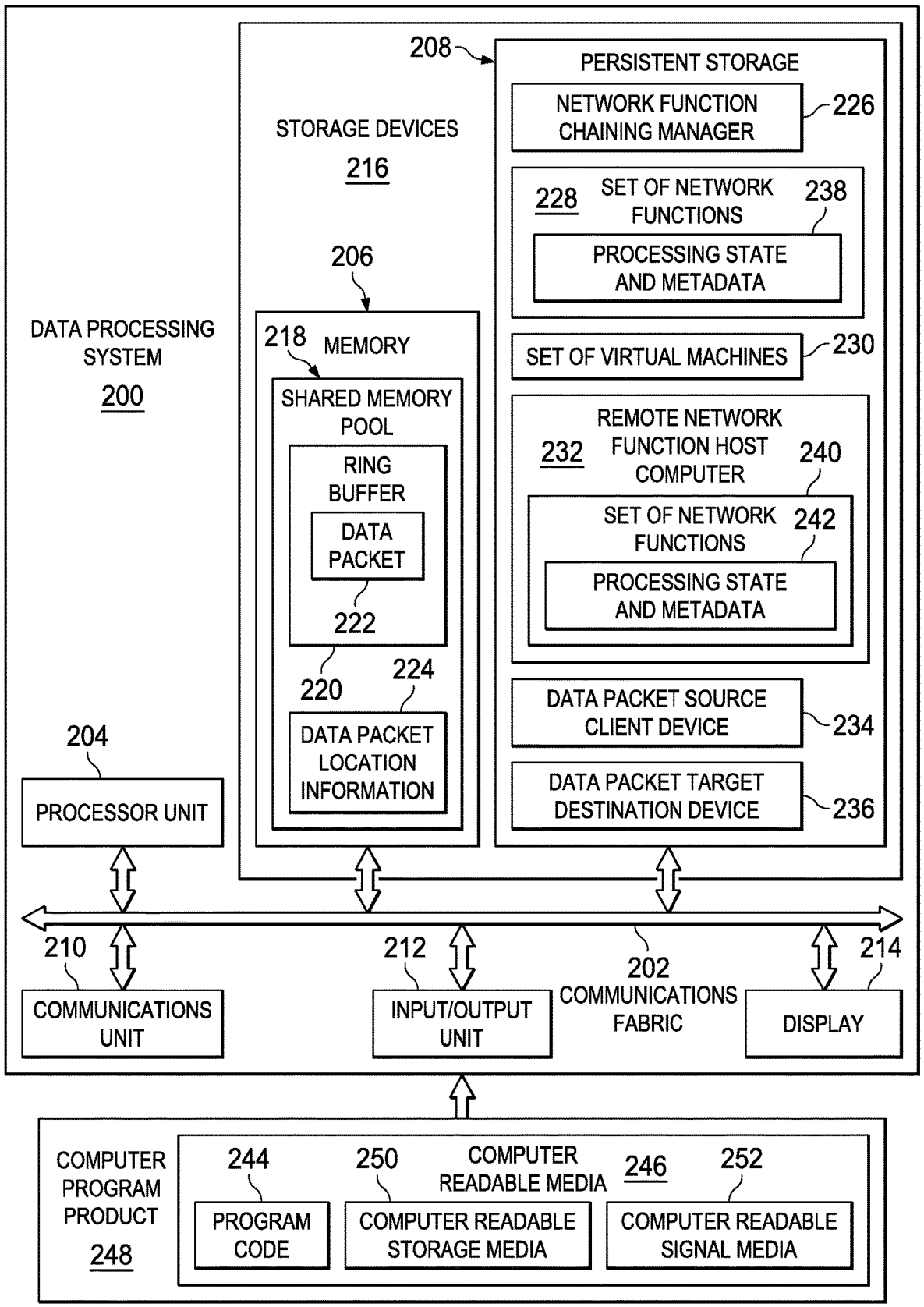
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device.

In this example, memory 206 includes shared memory pool 218. Shared memory pool 218 is a portion of memory 206 that data processing system 200 shares with other remote devices, such as, for example, a remote network function host computer, using a remote memory sharing technique, such as, for example, remote direct memory access. Shared memory pool 218 includes ring buffer 220. Ring buffer 220 is a circular buffer or circular queue that stores data packets 222. Ring buffer 220 is a fixed-sized buffer. Data packets 222 represent information that is being transmitted via a network, such as, for example network 102 in FIG. 1, from a source client device to a target destination device.

Shared memory pool 218 also includes data packet location information 224. Data packet location information 224 identifies the location of each particular data packet in data packets 222 within ring buffer 220. A remote network function host computer may utilize data packet location information 224 to locate and access particular data packets within ring buffer 220 using remote direct memory access, for example.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores network function chaining manager 226. Network function chaining manager 226 controls the chaining of a set of corresponding network functions, which provide a service to clients, within data processing system 200 and a set of one or more remote network function host computers. It should be noted that for purposes of this specification, the term "network function(s)" wherever found in this specification means "virtual network function(s)". Also, it should be noted that even though network function chaining manager 226 is illustrated as residing in persistent storage 208, in an alternative illustrative embodiment network function chaining manager 226 may be a separate component of data processing system 200. For example, network function chaining manager 226 may be a hardware component coupled to communication fabric 202 or a combination of hardware and software components.

In this example, persistent storage 208 also stores set of network functions 228, set of virtual machines 230, remote network function host computer 232, data packet source client device 234, and data packet target destination device 236. Set of network functions 228 represent a set of one or more virtual computer functions that provide a set of one or more services via a network. Set of network functions 228 may be, for example, a virtual router function, a virtual firewall function, a virtual load balancer function, a virtual content delivery network function, a virtual deep packet inspection function, a virtual wide area network accelerator function, and the like. Set of network functions 228 includes processing state and metadata 238. Processing state and metadata 238 represent the state of processing data packets 222 by set of network functions 228 and corresponding metadata.

Set of virtual machines 230 represents a set of one or more virtual machines that correspond to each particular network function in set of network functions 228. Data processing system 200 utilizes set of virtual machines to process data packets 222 according to which particular network function in set of network functions 228 is providing the client requested service.

Remote network function host computer 232 represents information regarding characteristics or properties of a particular remote network function computer, such as identification number, location, internet protocol address, owner, and the like. However, it should be noted that remote network function host computer 232 may represent information regarding a plurality of remote network function host computers. Remote network function host computer 232 works with data processing system 200 to further process data packets 222 using remote direct memory access according to set of network functions 240. Set of network functions 240 represents the particular set of virtual network functions that remote network function host computer 232 provides. Each particular virtual network function in set of network functions 240 of remote network function host computer 232 correspond to a virtual network function in set of network functions 228 of data processing system 200. Set of network functions 240 includes processing state and metadata 242, which is similar to processing state and metadata 238 of set of network functions 228.

Data packet source client device 234 identifies the particular client device that is responsible for sending data packets 222. Data packet source client device 234 may be a computer or other data processing device, such as a smart phone. Data packet source client device 234 also may represent a plurality of sending client devices. Data packet target destination device 236 identifies the particular device that will ultimately receive data packets 222. Data packet target destination device 236 may be a computer or other data processing device, such as a handheld computer.

Communications unit 210, in this example, provides for communication with other computers, data processing systems, and devices via a network, such as network 102 in FIG. 1. Communications unit 210 may be a network interface that provides communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It should be understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the provider of the service. Broad network access provides for capabilities that are available over a network and accessed through standard mechanisms, which promotes use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
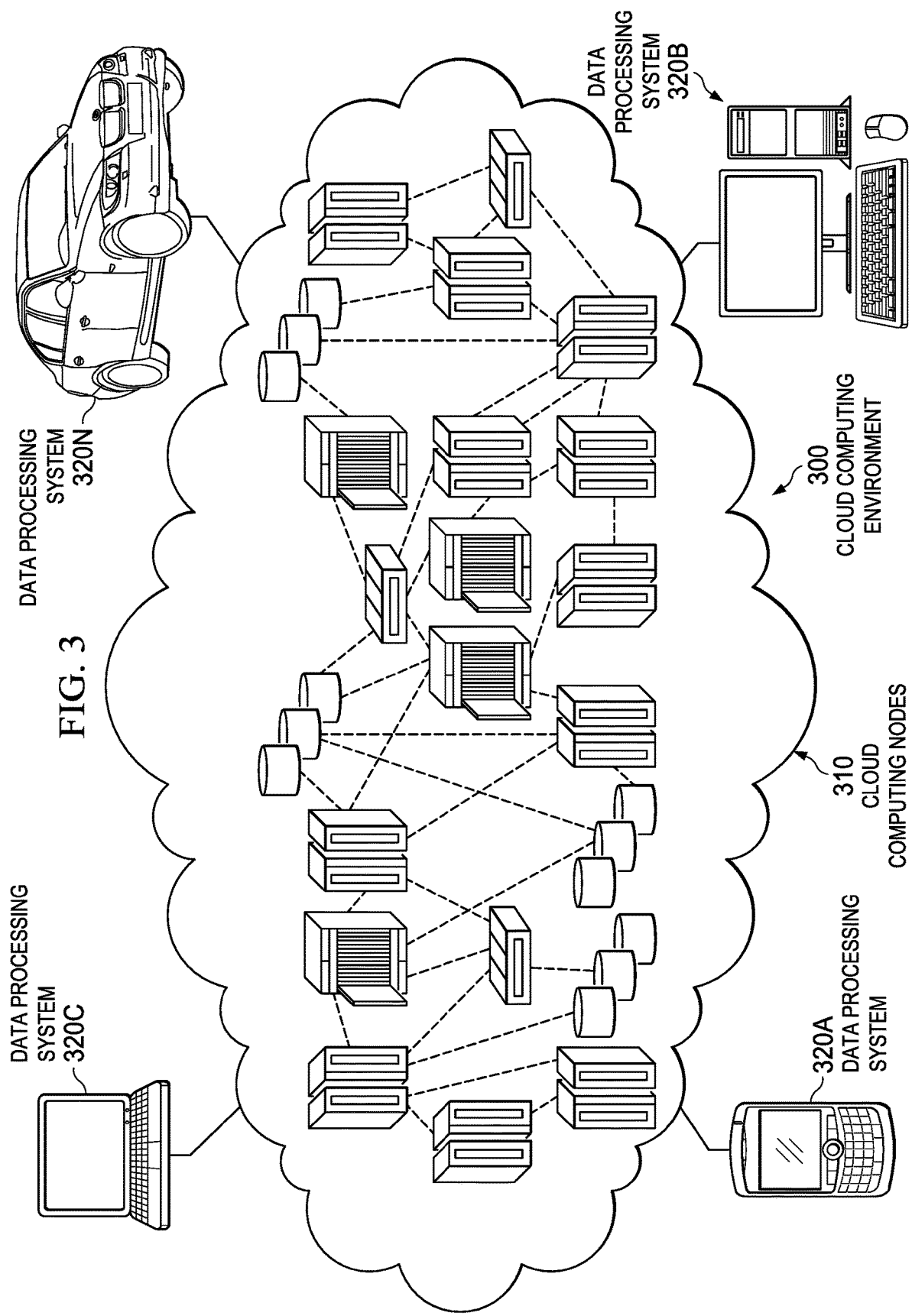
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local data processing systems used by cloud consumers may communicate. Cloud computing nodes 310 may be, for example, server 104 and server 106 in FIG. 1. Local data processing systems that communicate with cloud computing nodes 310 include data processing system 320A, which may be a personal digital assistant or a smart phone, data processing system 320B, which may be a desktop computer or a network computer, data processing system 320C, which may be a laptop computer, and data processing system 320N, which may be a computer system of an automobile. Data processing systems 320A-320N may be, for example, clients 110-114 in FIG. 1.

Cloud computing nodes 310 may communicate with one another and may be grouped physically or virtually into one or more cloud computing networks, such as a private cloud computing network, a community cloud computing network, a public cloud computing network, or a hybrid cloud computing network. This allows cloud computing environment 300 to offer infrastructure, platforms, and/or software as services without requiring the cloud consumers to maintain these resources on their local data processing systems, such as data processing systems 320A-320N. It is understood that the types of data processing devices 320A-320N are intended to be examples only and that cloud computing nodes 310 and cloud computing environment 300 can communicate with any type of computerized device over any type of network and/or network addressable connection using a web browser, for example.

Figure 4:
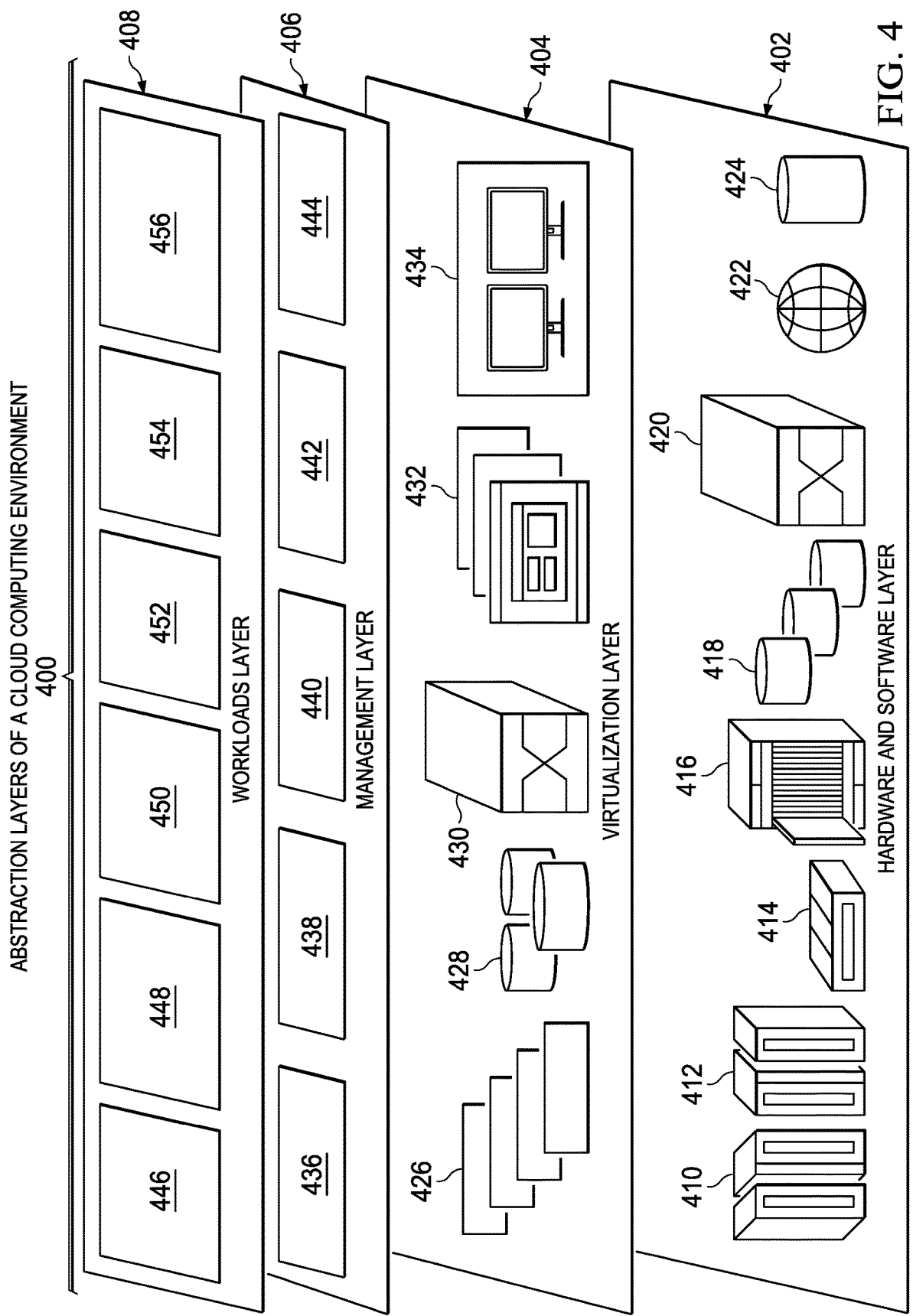
FIG. 4 is a diagram illustrating an example of abstraction layers of a cloud computing environment in accordance with an illustrative embodiment.

With reference now to FIG. 4, a diagram illustrating an example of abstraction layers of a cloud computing environment is depicted in accordance with an illustrative embodiment. The set of functional abstraction layers shown in this illustrative example may be implemented in a cloud computing environment, such as cloud computing environment 300 in FIG. 3. Also, it should be noted that the layers, components, and functions shown in FIG. 4 are intended to be examples only and not intended to be limitations on illustrative embodiments.

In this example, abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430 including virtual private networks; virtual applications and operating systems 432; and virtual machines 434.

Management layer 406 may provide a plurality of different management functions, such as, for example, resource provisioning 436, metering and pricing 438, security and user portal 440, service level management 442, and virtual machine environment management 444. Resource provisioning 436 dynamically procures computing resources and other resources, which are utilized to perform workloads or tasks within the cloud computing environment. Metering and pricing 438 provides cost tracking as resources are utilized within the cloud computing environment and billing for consumption of these resources. In one example, these resources may comprise application software licenses. Security of security and user portal 440 provides identity verification for cloud consumers and workloads, as well as protection for data and other resources. User portal of security and user portal 440 provides access to the cloud computing environment for cloud consumers and system administrators. Service level management 442 provides cloud computing resource allocation and management such that required service levels are met based on service level agreements. Network function chaining management 444 provides management of associating network functions in a local network function host computer with corresponding network functions in a remote network function host computer.

Workloads layer 408 provides the functionality of the cloud computing environment. Example workloads and functions provided by workload layer 408 may include mapping and navigation 446, software development and lifecycle management 448, virtual classroom education delivery 450, data analytics processing 452, transaction processing 454, and data packets processing using chained corresponding network functions in local and remote network function host computers 456.

Network function virtualization is a network architecture concept that uses technologies of virtualization to virtualize network node functions into building blocks that may connect, or chain together, to create services. Network function virtualization relies upon, but differs from, traditional server-virtualization techniques, such as those used in enterprise information technology. A virtualized network function may consist of one or more virtual machines running different software and processes, on top of high-volume servers, switches and storage, or even cloud computing infrastructure, instead of having custom hardware appliances for each network function. For example, a virtual session border controller could be deployed to protect a network without the typical cost and complexity of obtaining and installing physical units. Other examples of network function virtualization may include virtualized load balancers, firewalls, intrusion detection devices, and wide area network accelerators. Virtualized network functions utilize virtualized platforms and manage the virtualized platforms with software.

Software-defined networking is an approach to computer networking that allows network administrators to manage network services through abstraction of higher-level functionality. This is done by decoupling the system that makes decisions about where traffic is sent (i.e., the control plane) from the underlying systems that forward traffic to the selected destination (i.e., the data plane), such that the control plane resides centrally and the forwarding components remain distributed. Software-defined networking requires some method for the control plane to communicate with the data plane. One such communication mechanism is an OpenFlow protocol. Software-defined networking steers data packet flows from a centralized software-defined network controller to create a global view using the OpenFlow protocol.

10 Gbps data packet (e.g., 14,880,952 data packets/s) processing requires 67 ns processing time per each 64 byte data packet. When multiple machines process data packets, these data packets incur additional latency due to: 1) memory copy to/from operating system buffers; 2) encapsulation and un-encapsulation using Internet Protocols; and 3) context switches through operating system kernel and user space.

Remote direct memory access supports zero-copy networking by enabling a network interface to transfer data directly to or from a remote application memory. This zero-copy networking eliminates the need to copy data between application memory and the data buffers in the operating system.

Illustrative embodiments provide a system for chaining network function services through a distributed memory sharing technique, such as remote direct memory access, to increase data packet processing performance of software-defined networks or clouds. Illustrative embodiments deploy a cluster of machines that run a set of one or more virtualized network functions. The set of one or more virtualized network functions share processing state and metadata between the virtualized network functions using remote direct memory access. A network function of a local network function host computer processes data packets by fetching required metadata from a corresponding network function on a remote network function host computer. The local network function host computer sends the data packets directly from local network function host computer to a target destination device.

Software-defined networks or clouds may utilize illustrative embodiments to enable high performance data packet processing in a virtualized network environment for packet scrubbing, denial-of-service or distributed denial-of-service attack detection, and the like, at low latency. A denial-of-service attack is an attempt to make a machine or network resource unavailable to its intended users, such as to temporarily or indefinitely interrupt or suspend services of a host connected to the Internet. A distributed denial-of-service attack is where the attack is from multiple sources. Such attacks often target sites or services hosted on web servers for banks or credit card payment gateways, for example.

In addition, illustrative embodiments may provide pluggable network functions without changing network paths. Thus, illustrative embodiments may provide flexibility to chain network functions in a cluster without sacrificing latency. Further, illustrative embodiments may simplify network function virtualization application design by providing a shared memory interface instead of passing data packets (e.g., messages) between virtualized network functions spread across the cluster.

By providing design flexibility, illustrative embodiments may attract customers that have dynamic workloads. In addition, illustrative embodiments may increase business value to these customers in software-defined network or cloud environments by providing higher performance and lower latency.

Figure 5:
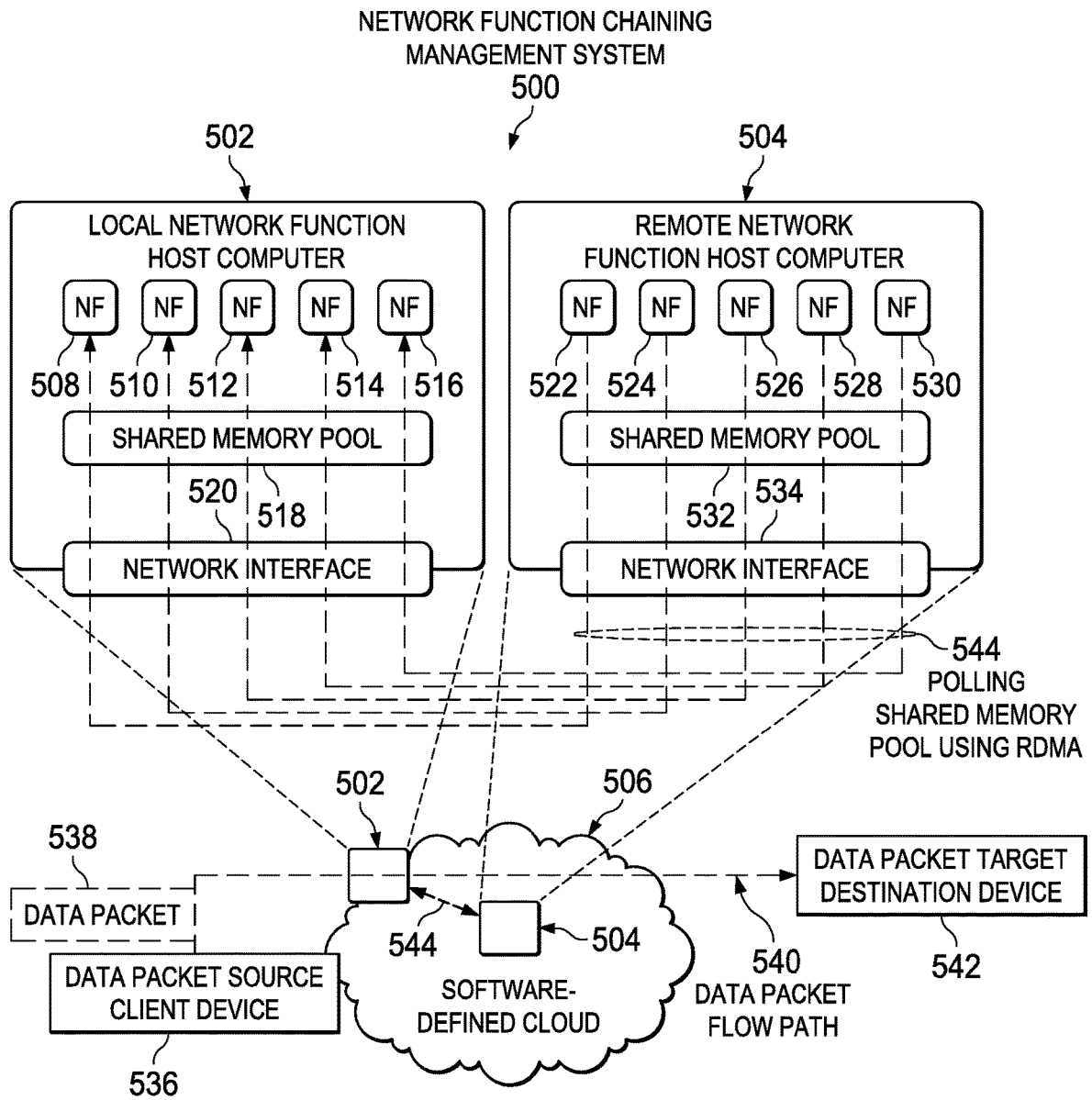
FIG. 5 is a diagram of an example of a network function chaining management system in accordance with an illustrative embodiment.

With reference now to FIG. 5, a diagram of an example of a network function chaining management system is depicted in accordance with an illustrative embodiment. Network function chaining management system 500 may be implemented in a network of data processing systems, such as, for example, network data processing system 100 in FIG. 1 or a cloud computing environment, such as, for example, cloud computing environment 300 in FIG. 3.

Network function chaining management system 500 includes local network function host computer 502 and remote network function host computer 504, which are coupled together by software-defined cloud 506. Local network function host computer 502 may be, for example, data processing system 200 in FIG. 2. Remote network function host computer 232 in FIG. 2 may represent information regarding remote network function host computer 504.

In this example, local network function host computer 502 includes network function 508, network function 510, network function 512, network function 514, and network function 516. However, it should be noted that local network function host computer 502 may include more or fewer network functions than illustrated. Network functions 508-516 may be, for example, set of network functions 228 in FIG. 2. Network functions 508-516 represent a set of one or more different virtualized network functions provided by local network function host computer 502.

Local network function host computer 502 also includes shared memory pool 518 and network interface 520. Shared memory pool 518 may be, for example, shared memory pool 218 in FIG. 2. Network interface 520 may be, for example, communications unit 210 in FIG. 2.

In this example, remote network function host computer 504 includes network function 522, network function 524, network function 526, network function 528, and network function 530. However, it should be noted that remote network function host computer 504 may include more or fewer network functions than illustrated. Network functions 522-530 may be represented by set of network functions 240 in FIG. 2, for example. Network functions 522-530 represent a set of one or more different virtualized network functions provided by remote network function host computer 504.

Remote network function host computer 504 also includes shared memory pool 532 and network interface 534. Shared memory pool 532 and network interface 534 are similar to shared memory pool 518 and network interface 520 of local network function host computer 502.

Also in this example, network function 508, network function 510, network function 512, network function 514, and network function 516 correspond to network function 522, network function 524, network function 526, network function 528, and network function 530, respectively. Further in this example, data packet source client device 536 sends data packet 538 via data packet flow path 540 to data packet target destination device 542. Local network function host computer 502 may process data packet 538 using, for example, network function 508. Network function 508 may be, for example, a router function to route data packet 538 to data packet target destination device 542.

In addition, remote network function host computer 504 may further process data packet 538 using corresponding network function 522. Remote network function host computer 504 may poll shared memory pool 518 for data packet 538 using remote direct memory access at 544. Network function 522 may be, for example, a deep packet inspection function that inspects data packet 538 to determine whether data packet 538 is a denial-of-service attack on data packet target destination device 542. However, network function 522 also may collect statistics regarding data packet 538 and make decisions regarding data packet 538, such as direct local network function host computer 502 to drop data packet 538 in response to network function 522 determining that data packet 538 is a denial-of-service attack.

Figure 6:
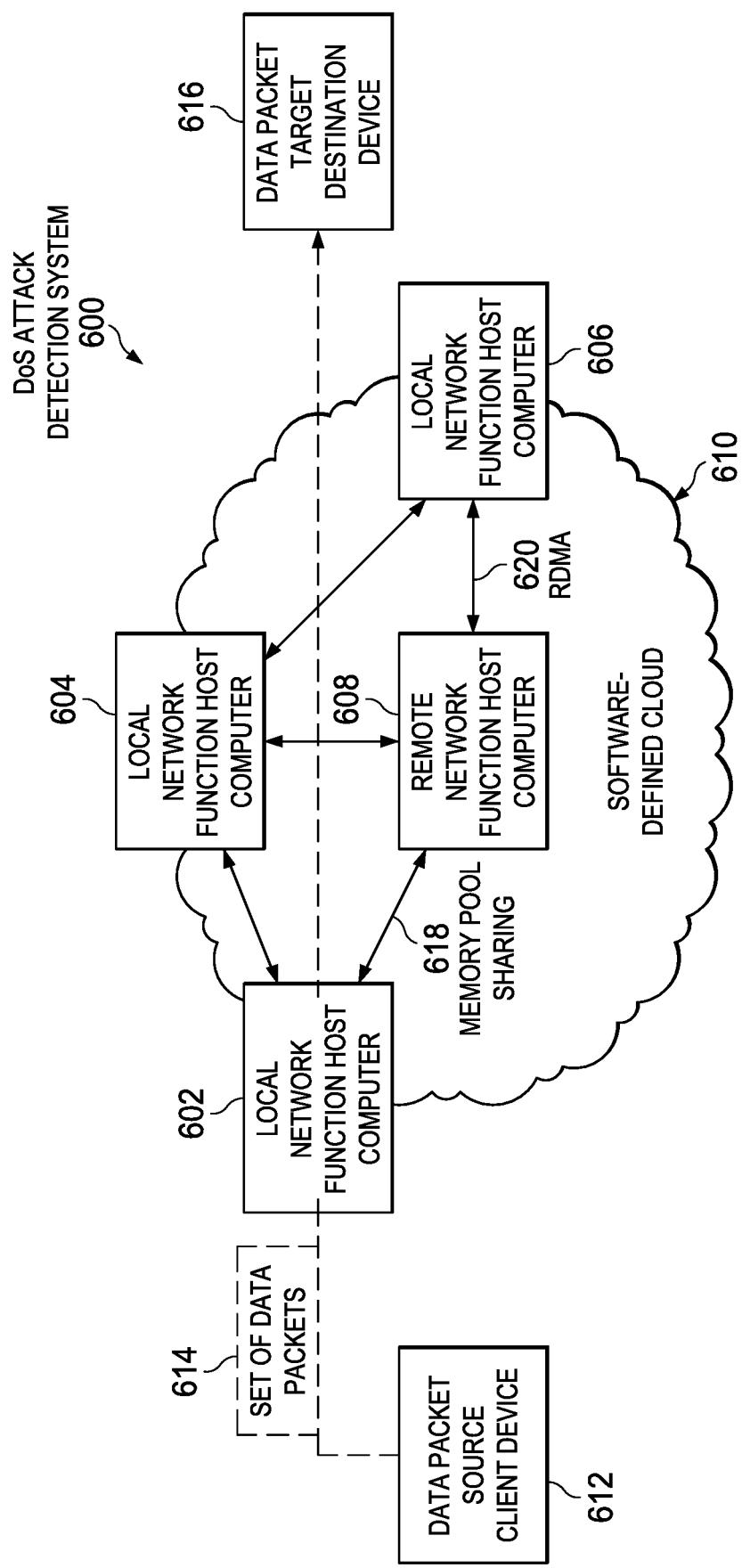
FIG. 6 is a diagram of an example of a denial-of-service attack detection system in accordance with an illustrative embodiment.

With reference now to FIG. 6, a diagram of an example of a denial-of-service attack detection system is depicted in accordance with an illustrative embodiment. Denial-of-service attack detection system 600 may be implemented in a network of data processing systems, such as, for example, network data processing system 100 in FIG. 1 or a cloud computing environment, such as, for example, cloud computing environment 300 in FIG. 3.

Denial-of-service attack detection system 600 includes local network host computer 602, local network host computer 604, local network host computer 606, and remote network host computer 608, which are coupled by software-defined cloud 610. An example of a remote network function application may be a data packet scrubber that filters out malicious data packets. Local network host computers 602-606 are similar to local network host computer 502 in FIG. 5. Remote network host computer 608 is similar to remote network host computer 504 in FIG. 5.

Data packet source client device 612 sends set of data packets 614 to data packet target destination device 616 similar to data packet source client device 536 sending data packet 538 to data packet target destination device 542 in FIG. 5. Local network host computers 602-606 share information with remote network host computer 608 via memory pool sharing, such as memory pool sharing 618, using remote direct memory access, such as remote direct memory access 620. Remote network host computer 608 may collect and analyze this shared information and corresponding metadata regarding data traffic patterns, such as frequency of connections from an Internet Protocol subnet, heuristics thresholds, and the like, to identify and learn denial-of-service attack patterns. Local network host computers 602-606 and remote network host computer 608 are able to share data with low latency using remote direct memory access, instead of using traditional TCP/IP stacks that increase data packet processing latency.

Figure 7:
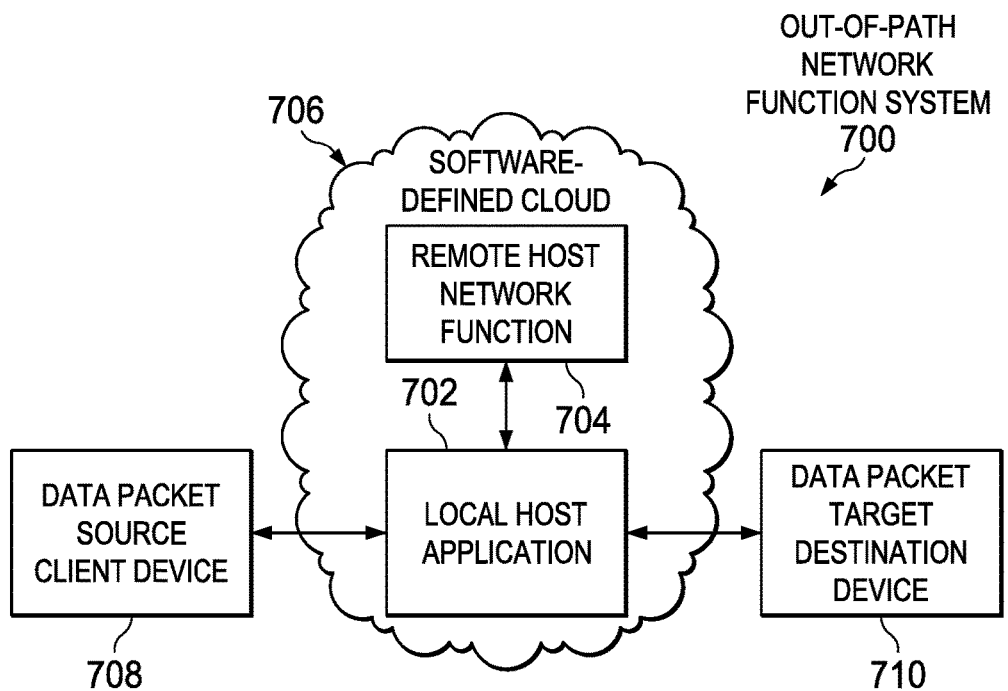
FIG. 7 is a diagram of an example of a out-of-path network function system in accordance with an illustrative embodiment.

With reference now to FIG. 7, a diagram of an example of a out-of-path network function system is depicted in accordance with an illustrative embodiment. Out-of-path network function system 700 may be implemented in a network of data processing systems, such as, for example, network data processing system 100 in FIG. 1 or a cloud computing environment, such as, for example, cloud computing environment 300 in FIG. 3.

In this example, out-of-path network function system 700 includes local host application 702 and remote host network function 704, which are coupled by software-defined cloud 706. Also, data packet source client device 708 sends a set of data packets to data packet target destination device 710 via local host application 702. Typically, out-of-path network functions increase latency due to the processing delay and round-trip delay caused by Internet Protocol packet exchanges with a remote machine. However, using remote direct memory access, an out-of-path network function, such as remote host network function 704, may share memory directly with an in-path network function, such as local host application 702, so that end-to-end processing latency is minimized between data packet source client device 708 and data packet target destination device 710.

Figure 8:
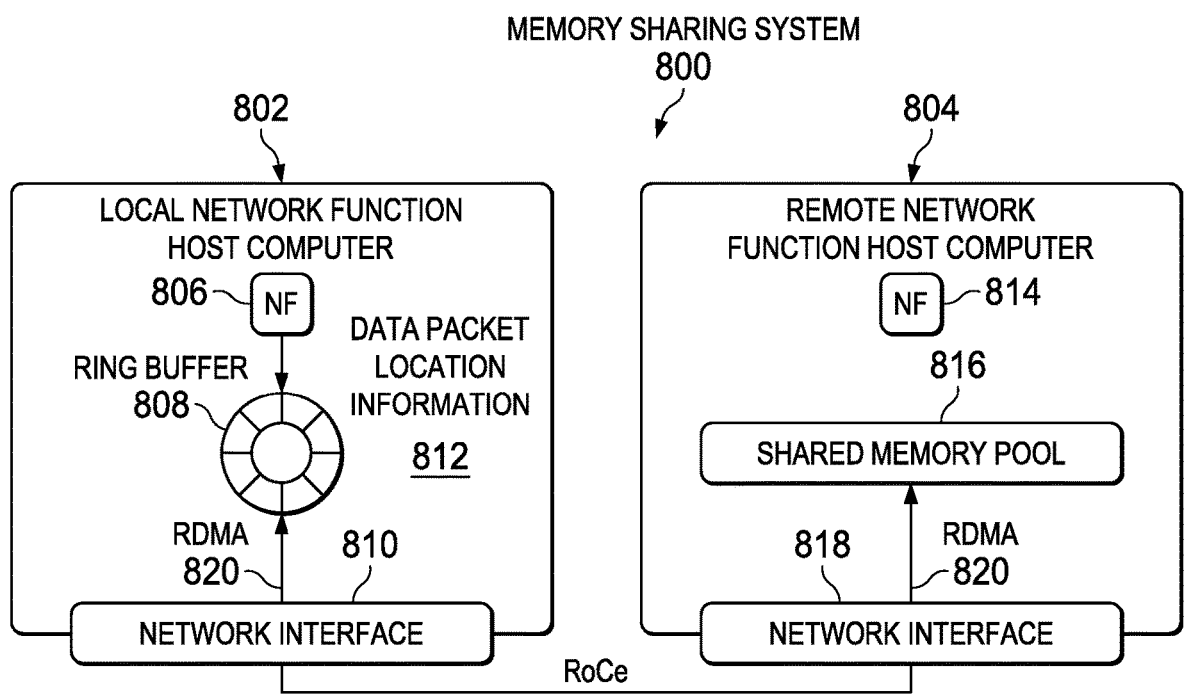
FIG. 8 is a diagram of an example of a memory sharing system in accordance with an illustrative embodiment.

With reference now to FIG. 8, a diagram of an example of a memory sharing system is depicted in accordance with an illustrative embodiment. Memory sharing system 800 may be implemented in a network of data processing systems, such as, for example, network data processing system 100 in FIG. 1 or a cloud computing environment, such as, for example, cloud computing environment 300 in FIG. 3.

In this example, memory sharing system 800 includes local network function host computer 802 and remote network function host computer 804. However, it should be noted that memory sharing system 800 may include a plurality of local and remote network function host computers and the remote shared memory pool may be a ring buffer or a flat memory buffer depending on how the memory is shared between a local network function and a remote network function. Local network function host computer 802 and remote network function host computer 804 are similar to local network function host computer 502 and remote network function host computer 504 in FIG. 5.

Local network function host computer 802 includes network function 806, ring buffer 808, and network interface 810. Network function 806 may be, for example, network function 508 in FIG. 5. Ring buffer 808 may be, for example, ring buffer 220 in shared memory pool 218 in FIG. 2. Network interface 810 may be, for example, network interface 520 in FIG. 5.

Remote network function host computer 804 includes network function 814, shared memory pool 816, and network interface 818. Network function 814 may be, for example, network function 522 in FIG. 5, and corresponds to network function 806. Shared memory pool 816 may be, for example, shared memory pool 532 in FIG. 5. Network interface 818 may be, for example, network interface 534 in FIG. 5.

Memory sharing system 800 utilizes ring buffer 808 to share data, without race conditions, between local network function host computer 802 and remote network function host computer 804. Data packet location information 812 (e.g., head and tail information) is shared separately. Data packet location information 812 may be, for example, data packet location information 224 in FIG. 2. Also, ring buffer 808 fixes a maximum data packet transfer size.

Network function 814 in remote network function host computer 804 polls ring buffer 808 using remote direct memory access 820. Memory sharing system 800 may utilize Remote Direct Memory Access over Converged Ethernet (RoCE), for example. Network function 814 processes data packets in ring buffer 808 and marks as "processed" each data packet in ring buffer 808. Local network function host computer 802 sends out processed data packets or time-out packets to a data packet target destination device, such as data packet target destination device 542 in FIG. 5.

Figure 9A:
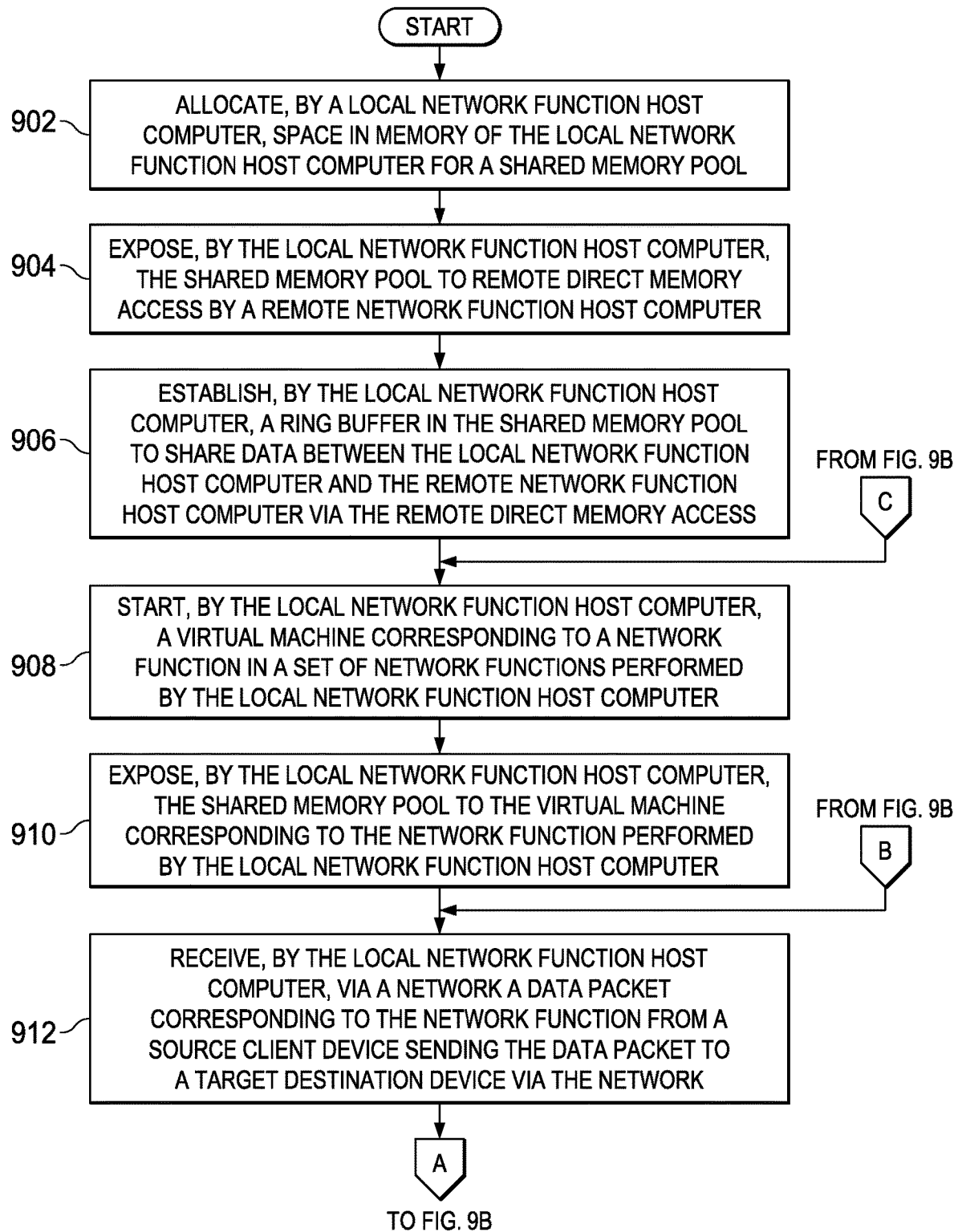
FIGS. 9A-9B are a flowchart illustrating a process for chaining network functions by sharing memory of a local network function host computer and a remote network function host computer in accordance with an illustrative embodiment.
Figure 9B:
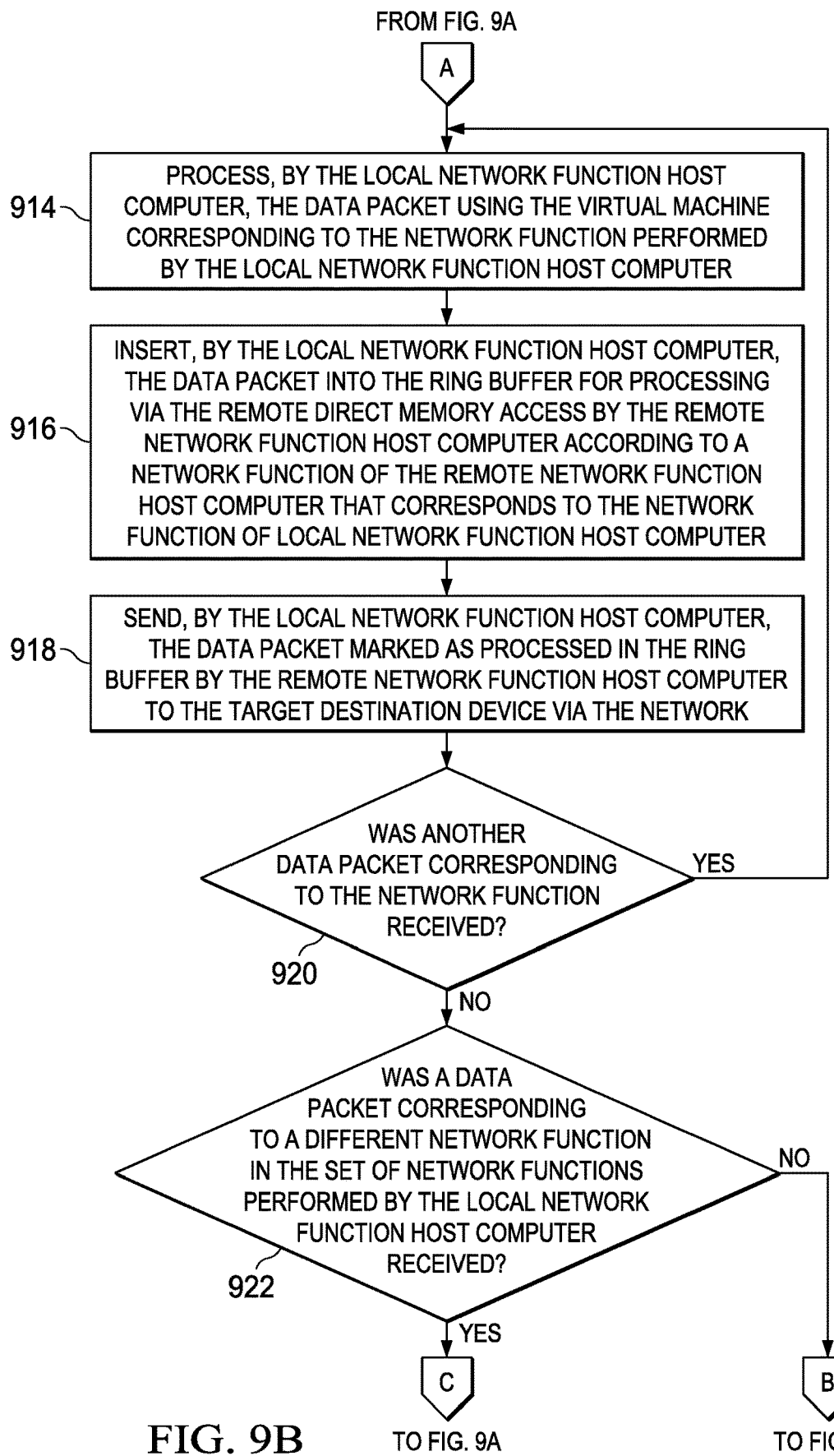

With reference now to FIGS. 9A-9B, a flowchart illustrating a process for chaining network functions by sharing memory of a local network function host computer and a remote network function host computer is shown in accordance with an illustrative embodiment. The process shown in FIGS. 9A-9B may be implemented in a computer, such as, for example, server 104 or client 110 in FIG. 1 and data processing system 200 in FIG. 2.

The process begins when the local network function host computer allocates space in memory of the local network function host computer for a shared memory pool (step 902). The local network function host computer may be, for example, local network function host computer 502 in FIG. 5 and local network function host computer 802 in FIG. 8. The memory may be, for example, memory 206 in FIG. 2. The shared memory pool may be, for example, shared memory pool 218 in FIG. 2 and shared memory pool 518 in FIG. 5.

In addition, the local network function host computer exposes the shared memory pool to remote direct memory access by the remote network function host computer (step 904). The remote network function host computer may be, for example, remote network function host computer 504 in FIG. 5 or remote network function host computer 804 in FIG. 8. The remote direct memory access by the remote network function host computer may be, for example, remote direct memory access 820 in FIG. 8.

Further, the local network function host computer establishes a ring buffer in the shared memory pool to share data between the local network function host computer and the remote network function host computer via the remote direct memory access (step 906). The ring buffer may be, for example, ring buffer 220 in FIG. 2 and ring buffer 808 in FIG. 8. The local network function host computer also starts a virtual machine corresponding to a network function in a set of network functions performed by the local network function host computer (step 908). The virtual machine may be, for example, a virtual machine in set of virtual machines 230 in FIG. 2. The network function in the set of network functions may be, for example, a network function in set of network functions 228 in FIG. 2 and network function 508 of network functions 508-516 in FIG. 5.

Furthermore, the local network function host computer exposes the shared memory pool to the virtual machine corresponding to the network function performed by the local network function host computer (step 910). Subsequently, the local network function host computer receives via a network a data packet corresponding to the network function from a source client device sending the data packet to a target destination device via the network (step 912). The network may be, for example, network 102 in FIG. 1. The data packet may be, for example, data packet 538 in FIG. 5. The source client device may be, for example, data packet source client device 536 in FIG. 5. The target destination device may be, for example, data packet target destination device 542 in FIG. 5.

The local network function host computer processes the data packet using the virtual machine corresponding to the network function performed by the local network function host computer (step 914). Afterward, the local network function host computer inserts the data packet into the ring buffer for processing via the remote direct memory access by the remote network function host computer according to a network function of the remote network function host computer that corresponds to the network function of local network function host computer (step 916). The network function of the remote network function host computer corresponding to the network function of local network function host computer may be, for example, network function 522 corresponding to network function 508 in FIG. 5 or network function 814 corresponding to network function 806 in FIG. 8.

Subsequently, the local network function host computer sends the data packet marked as processed in the ring buffer by the remote network function host computer to the target destination device via the network (step 918). Afterward, the local network function host computer makes a determination as to whether another data packet corresponding to the network function was received (step 920). If the local network function host computer determines that another data packet corresponding to the network function was received, yes output of step 920, then the process returns to step 914 where the local network function host computer processes that data packet using the virtual machine. If the local network function host computer determines that another data packet corresponding to the network function was not received, no output of step 920, then the local network function host computer makes a determination as to whether a data packet corresponding to a different network function in the set of network functions performed by the local network function host computer was received (step 922).

If the local network function host computer determines that a data packet corresponding to a different network function in the set of network functions performed by the local network function host computer was not received, no output of step 922, then the process returns to step 912 where the local network function host computer waits to receive a data packet. If the local network function host computer determines that a data packet corresponding to a different network function in the set of network functions performed by the local network function host computer was received, yes output of step 922, then the process returns to step 908 where the local network function host computer starts another virtual machine corresponding to the different network function.

Figure 10:
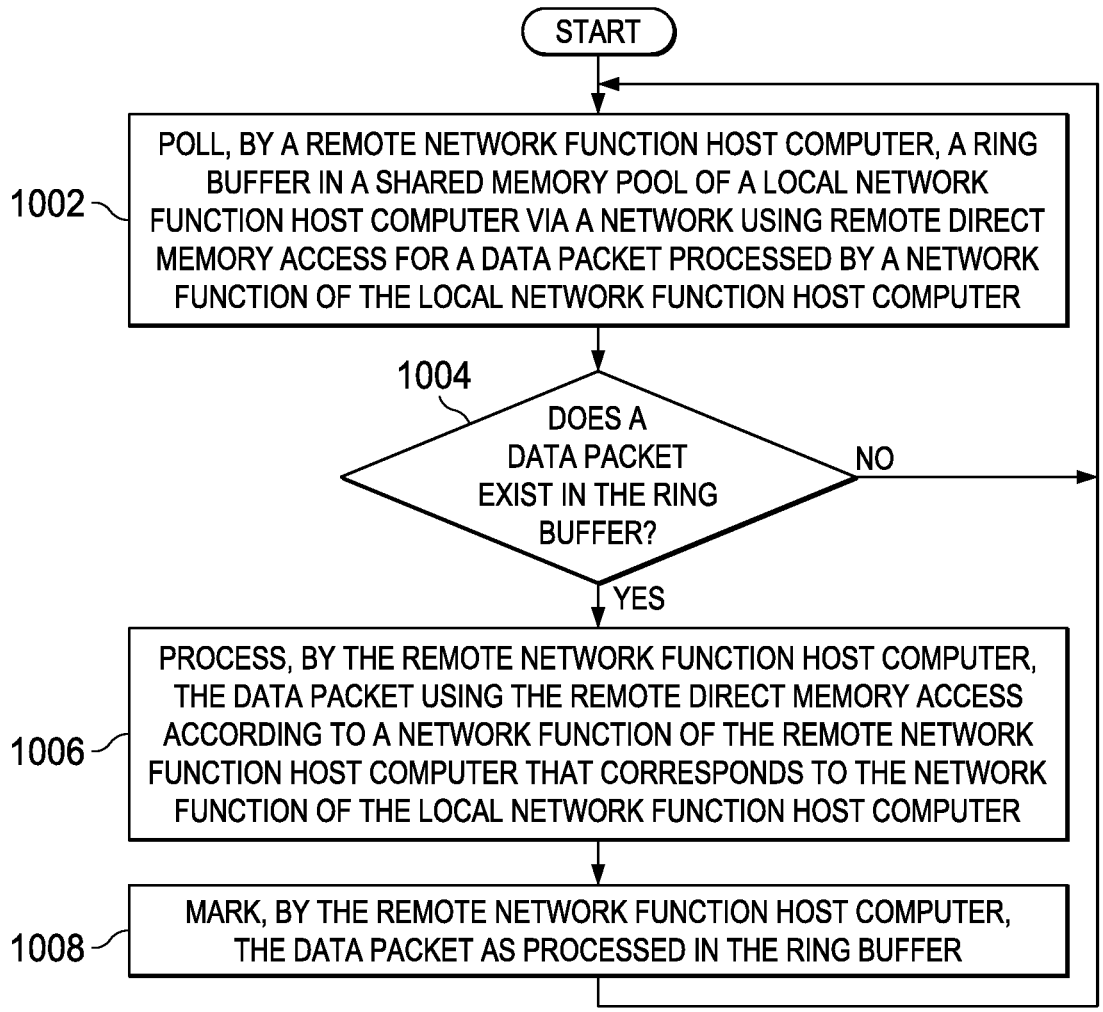
FIG. 10 is a flowchart illustrating a process for processing a data packet by a remote network function host computer using remote direct memory access in accordance with an illustrative embodiment.

With reference now to FIG. 10, a flowchart illustrating a process for processing a data packet by a remote network function host computer using remote direct memory access is shown in accordance with an illustrative embodiment. The process shown in FIG. 10 may be implemented in a computer, such as, for example, server 106 or client 112 in FIG. 1.

The process begins when the remote network function host computer polls a ring buffer in a shared memory pool of a local network function host computer via a network using remote direct memory access for a data packet processed by a network function of the local network function host computer (step 1002). The remote network function host computer may be, for example, remote network function host computer 504 in FIG. 5 or remote network function host computer 804 in FIG. 8. The ring buffer in the shared memory pool of the local network function host computer may be, for example, ring buffer 220 in FIG. 2 or ring buffer 808 in FIG. 8. The network may be, for example, network 102 in FIG. 1. The remote direct memory access may be, for example, remote direct memory access 820 in FIG. 8. The data packet may be, for example, data packet 538 in FIG. 5. The network function of the local network function host computer may be, for example, network function 508 of local network function host computer 502 in FIG. 5.

Afterward, the remote network function host computer makes a determination as to whether a data packet exists in the ring buffer (step 1004). If the remote network function host computer determines that a data packet does not exist in the ring buffer, no output of step 1004, then the process returns to step 1002 where the remote network function host computer continues to poll the ring buffer for a data packet. If the remote network function host computer determines that a data packet does exist in the ring buffer, yes output of step 1004, then the remote network function host computer processes the data packet using the remote direct memory access according to a network function of the remote network function host computer that corresponds to the network function of the local network function host computer (step 1006). The network function of the remote network function host computer corresponding to the network function of the local network function host computer may be, for example, network function 522 corresponding to network function 508. Subsequently, the remote network function host computer marks the data packet as processed in the ring buffer (step 1008). Thereafter, the process returns to step 1002 where the remote network function host computer continues to poll the ring buffer for a data packet.

Thus, illustrative embodiments of the present invention provide a computer-implemented method, computer system, and computer program product for chaining network function services via distributed memory sharing to increase data packet processing performance in software-defined network or cloud environments. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for chaining virtual network functions, the computer-implemented method comprising:
   processing, by a computer, a data packet received from a source client device using a network function of the computer;
   inserting, by the computer, the data packet into a shared memory pool for processing via remote direct memory access by a remote computer according to a network function of the remote computer that corresponds to the network function of the computer;
   sending, by the computer, the data packet to a target destination device via a network in response to the remote computer marking the data packet as processed in the shared memory pool by the remote computer; and
   establishing, by the computer, a ring buffer in the shared memory pool to share data between the computer and the remote computer via the remote direct memory access, wherein the remote computer polls the ring buffer in the shared memory pool of the computer via the network using the remote direct memory access for the data packet processed by the network function of the computer.

2. The computer-implemented method of claim 1 further comprising:
   allocating, by the computer, space in memory of the computer for the shared memory pool.

3. The computer-implemented method of claim 1 further comprising:
   exposing, by the computer, the shared memory pool to the remote direct memory access by the remote computer in order to share processing state and metadata between the network function of the computer and the network function of the remote computer using the shared memory pool.

4. The computer-implemented method of claim 1, wherein the remote computer utilizes data packet location information included in the shared memory pool to locate the data packet in the ring buffer.

5. The computer-implemented method of claim 1 further comprising:
   starting, by the computer, a virtual machine corresponding to the network function of the computer;
   exposing, by the computer, the shared memory pool to the virtual machine corresponding to the network function performed by the computer; and
   processing, by the computer, the data packet using the virtual machine that corresponds to the network function of the computer.

6. The computer-implemented method of claim 1 further comprising:
   receiving, by the computer, via the network the data packet corresponding to the network function from the source client device sending the data packet to the target destination device via the network.

7. The computer-implemented method of claim 1, wherein the computer and the remote computer are coupled together by one of a software-defined cloud or a software-defined network.

8. The computer-implemented method of claim 1, wherein the network function of the computer is one of a plurality of different network functions performed by the computer.

9. The computer-implemented method of claim 1, wherein the network function of the computer is a router function that routes the data packet to the target destination device via the network.

10. The computer-implemented method of claim 1, wherein the network function of the remote computer that corresponds to the network function of the computer is a deep packet inspection function that identifies denial-of-service attacks on the target destination device.

11. A computer system for chaining virtual network functions, the computer system comprising:
    a bus system;
    a storage device connected to the bus system, wherein the storage device stores program instructions; and
    a processor connected to the bus system, wherein the processor executes the program instructions to:
    process a data packet received from a source client device using a network function of the computer system;
    insert the data packet into a shared memory pool for processing via remote direct memory access by a remote computer system according to a network function of the remote computer system that corresponds to the network function of the computer system;
    send the data packet to a target destination device via a network in response to the remote computer system marking the data packet as processed in the shared memory pool by the remote computer; and
    establish a ring buffer in the shared memory pool to share data between the computer and the remote computer via the remote direct memory access, wherein the remote computer polls the ring buffer in the shared memory pool of the computer via the network using the remote direct memory access for the data packet processed by the network function of the computer.

12. The computer system of claim 11, wherein the processor further executes the program instructions to:
    expose the shared memory pool to the remote direct memory access by the remote computer system in order to share processing state and metadata between the network function of the computer and the network function of the remote computer using the shared memory pool.

13. A computer program product for chaining virtual network functions, the computer program product comprising a non-transitory computer readable storage medium having program instructions embodied therewith, the program instructions executable by a computer to cause the computer to perform a method comprising:
    processing, by the computer, a data packet received from a source client device using a network function of the computer;
    inserting, by the computer, the data packet into a shared memory pool for processing via remote direct memory access by a remote computer according to a network function of the remote computer that corresponds to the network function of the computer;
    sending, by the computer, the data packet to a target destination device via a network in response to the remote computer marking the data packet as processed in the shared memory pool by the remote computer; and
    establishing, by the computer, a ring buffer in the shared memory pool to share data between the computer and the remote computer via the remote direct memory access, wherein the remote computer polls the ring buffer in the shared memory pool of the computer via the network using the remote direct memory access for the data packet processed by the network function of the computer.

14. The computer program product of claim 13 further comprising:
   allocating, by the computer, space in memory of the computer for the shared memory pool.

15. The computer program product of claim 13 further comprising:
   exposing, by the computer, the shared memory pool to the remote direct memory access by the remote computer in order to share processing state and metadata between the network function of the computer and the network function of the remote computer using the shared memory pool.

* * * * *